United States Patent [19]

Petitpierre

[11] 4,131,695
[45] Dec. 26, 1978

[54] AZO COLOR FORMER CONTAINING HEAT-SENSITIVE RECORDING MATERIAL

[75] Inventor: Jean C. Petitpierre, Kaiseraugst, Switzerland

[73] Assignee: Ciba-Geigy Corporation, Ardsley, N.Y.

[21] Appl. No.: 660,596

[22] Filed: Feb. 23, 1976

[30] Foreign Application Priority Data

Feb. 27, 1975 [CH] Switzerland ............ 2522/75
Aug. 8, 1975 [CH] Switzerland ............ 10378/75

[51] Int. Cl.² ............... B41M 5/18; B41M 5/26; C09B 29/06; C09B 29/08
[52] U.S. Cl. ............... 427/148; 260/196; 260/205; 260/206; 260/207; 260/207.1; 427/145; 427/207 A; 427/150; 427/152; 427/261; 428/318; 428/323; 428/411; 428/481; 428/492; 428/511; 428/535; 428/913
[58] Field of Search ............... 360/205-207.1, 360/196; 96/91; 427/148, 145, 207 A

[56] References Cited

U.S. PATENT DOCUMENTS

| | | | |
|---|---|---|---|
| 2,970,909 | 2/1961 | Slimowicz | 96/91 |
| 3,152,038 | 10/1964 | Urbschat et al. | 260/206 X |
| 3,508,492 | 4/1970 | Seibert et al. | 427/148 X |
| 3,598,802 | 8/1971 | Weaver et al. | 260/196 |
| 3,647,503 | 3/1972 | Mizutani et al. | 427/148 X |
| 3,871,065 | 3/1975 | Iomiyama et al. | 427/148 X |
| 3,924,041 | 12/1975 | Miyayama et al. | 427/148 X |
| 4,011,352 | 3/1977 | Janssens et al. | 427/145 |

FOREIGN PATENT DOCUMENTS

1399839 7/1975 United Kingdom ............ 427/148

*Primary Examiner*—Floyd D. Higel
*Attorney, Agent, or Firm*—Edward McC. Roberts; Michael W. Glynn

[57] ABSTRACT

A heat-sensitive recording material which contains as color former at least one azo compound of the formula

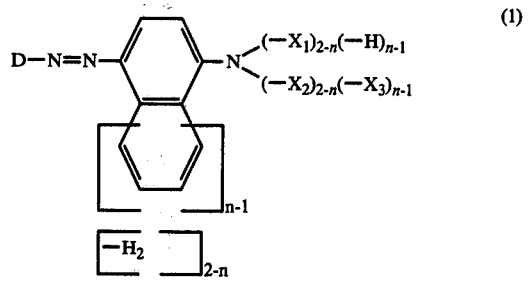

(1)

wherein

D represents a phenyl radical which is unsubstituted or substituted by halogen, alkyl, alkoxy, aryloxy, alkoxycarbonyl, N,N-dialkylaminocarbonyl, acylamino, N-acyl-N-alkylamino or the group

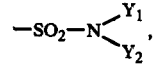

wherein each of $Y_1$ and $Y_2$ independently represents alkyl or aryl or, together with the nitrogen atom to which they are attached, represent a heterocyclic ring which optionally contains an oxygen atom, $X_1$ represents hydrogen or alkyl, $X_2$ represents alkyl, cyanoalkyl or arylmethyl, or $X_1$ and $X_2$, together with the nitrogen atom to which they are attached, represent a heterocyclic ring which optionally contains an oxygen atom, $X_3$ represents alkyl or aryl, and n is 1 or 2; said color former being dispersed or dissolved in a fusible binder layer on a substrate, and the material also containing an electron acceptor substance as a color developer.

11 Claims, No Drawings

AZO COLOR FORMER CONTAINING HEAT-SENSITIVE RECORDING MATERIAL

The present invention provides a heat-sensitive recording material which contains as colour former at least one azo compound of the formula

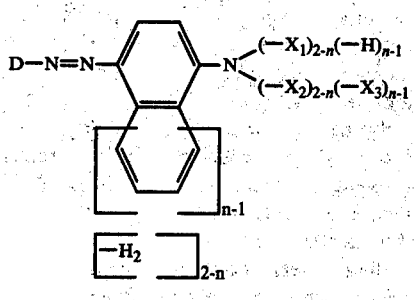

wherein
D represents a phenyl radical which is unsubstituted or substituted by halogen, alkyl, alkoxy, aryloxy, alkoxycarbonyl, N,N-dialkylaminocarbonyl, acylamino, N-acyl-N-alkylamino or the group

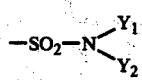

wherein each of $Y_1$ and $Y_2$ independently represents alkyl or aryl or, together with the nitrogen atom to which they are attached, represent a heterocyclic ring which optionally contains an oxygen atom,
$X_1$ represents hydrogen or alkyl,
$X_2$ represents alkyl, cyanoalkyl or arylmethyl, or $X_1$ and $X_2$, together with the nitrogen atom to which they are attached, represent a heterocyclic ring which optionally contains an oxygen atom,
$X_3$ represents alkyl or aryl, and
n is 1 or 2.

The preferred azo compounds of the present invention have the general formula

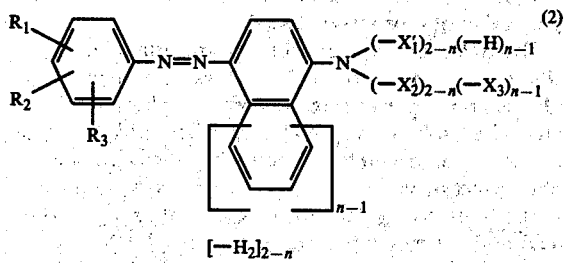

wherein
each of $R_1$, $R_2$ and $R_3$ represents hydrogen, halogen, alkyl, alkoxy, aryloxy, alkoxycarbonyl, N,N-dialkylaminocarbonyl, acylamino, N-acyl-N-alkylamino or

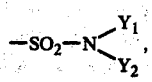

wherein each of $Y_1$ and $Y_2$ represents alkyl or aryl or together they represent alkylene,
$X_1'$ represents hydrogen or alkyl,
$X_2'$ represents alkyl, cyanoalkyl or arylmethyl, or $X_1'$ and $X_2'$ together represent alkylene,
$X_3$ represents alkyl or aryl, and
n is 1 or 2. Preferably n is 1.

According to a particular embodiment of the present invention, the colour formers are azo compounds of the following formula

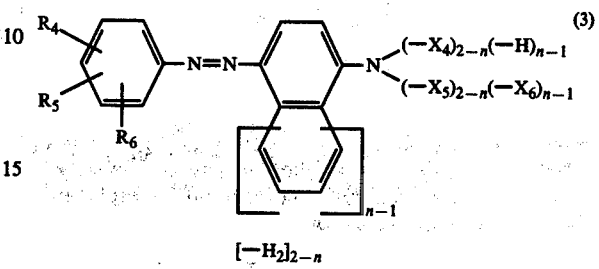

wherein
each of $R_4$, $R_5$ and $R_6$ represents hydrogen, halogen, lower alkyl, lower alkoxy, halophenoxy, phenoxy, lower alkoxycarbonyl, N,N-di-lower alkylaminocarbonyl, acetylamino, N-acetyl-N-lower alkylamino or

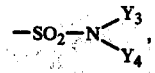

wherein each of $Y_3$ and $Y_4$ represents lower alkyl or phenyl, or together they represent alkylene of 4 or 5 carbon atoms, and at most two of the radicals $R_4$, $R_5$ and $R_6$ represent hydrogen,
$X_4$ represents hydrogen or lower alkyl,
$X_5$ represents lower alkyl, cyano-lower alkyl or benzyl, or
$X_4$ and $X_5$ together represent alkylene of 4 or 5 carbon atoms,
$X_6$ represents lower alkyl or phenyl, and
n is 1 or 2.

In the definition of the radicals of the colour formers, lower alkyl and lower alkoxy groups are normally to be understood as meaning those groups or group components that contain 1 to 5, in particular 1 to 3, carbon atoms, for example methyl, ethyl, n-propyl, isopropyl, n-butyl, sec. butyl or amyl, methoxy or ethoxy.

Where the substituent D contains one or more acyl groups, these are derived preferably from aliphatic monocarboxylic acids of 1 to 4 carbon atoms, for example from acetic acid. Where D contains one or more halogen atoms, these are, for example, iodine or bromine or, preferably, chlorine atoms.

A heterocyclic ring represented by $Y_1$ and $Y_2$ and $X_1$ and $X_2$, together with the nitrogen atom to which they are attached, is for example a piperidine or pyrrolidine ring. Where the heterocyclic ring additionally contains an oxygen atom, it is in particular a morpholino ring.

Aryl radicals in the above definitions of the colour formers represent in particular the naphthalene and diphenyl radicals, and, especially, phenyl residues, which are unsubstituted or substituted by halogen, methyl or methoxy.

The various radicals R and Y in a formula can be the same or different.

A particularly preferred thermoreactive recording or copying material of the present invention is that which contains as colour former an azo compound of the formula

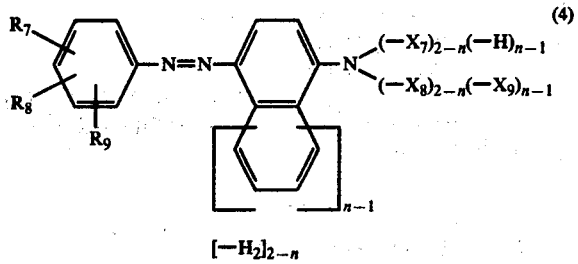

wherein
each of $R_7$, $R_8$ and $R_9$ represents hydrogen, chlorine, methyl, methoxy, phenoxy, dichlorophenoxy, methoxycarbonyl, N,N-dimethylaminocarbonyl, acetylamino, N-acetyl-N-methylamino or

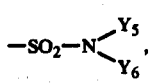

wherein each of $Y_5$ and $Y_6$ represents methyl, ethyl or phenyl, or together they represent the pentylene group and at most 2 of the radicals $R_7$, $R_8$ and $R_9$ represent hydrogen,
$X_7$ represents methyl or ethyl,
$X_8$ represents methyl, 2-cyanoethyl or benzyl,
$X_9$ represents methyl or ethyl, and
n is 1 or 2.

Particularly advantageous results are obtained with colour formers of the formula

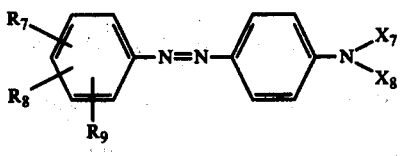

wherein $R_7$, $R_8$, $R_9$, $X_7$ and $X_8$ are as defined hereinbefore, especially preferred colour formers being those of the formula

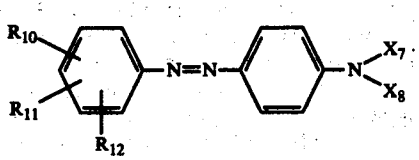

wherein each of $R_{10}$, $R_{11}$ and $R_{12}$ represents hydrogen, chlorine, methoxy, methoxycarbonyl, N,N-diethylaminosulphonyl or acetylamino, and at least two of the radicals $R_{10}$, $R_{11}$ and $R_{12}$ represent hydrogen, and $X_1$ and $X_8$ are as defined hereinbefore.

The colour formers contained in the copying materials of this invention are known and can be obtained by processes known to the person skilled in the art, for example by diazotising an appropriate aniline which is unsubstituted or ring-substituted and coupling it with a correspondingly N-substituted aniline or naphthylamine.

The present invention has for its object the provision of an inexpensive colour former system for use in heat-sensitive recording and copying materials in a colour range in which a slightly coloured background of the paper does not intrude. For most of the colour formers of the above formula (1) are yellow or orange when they are in the form of the free base. The colour formers of the formula (1) differ from the known colour formers in that they can be obtained easily and cheaply by chemical means.

The colour formers of the formula (1) used according to the invention have the property that a bathochromic displacement from 90 to 170 nm takes place and various new colour effects in the range from orange to blue and grey can be obtained by protonising the azo nitrogen atom or if its free pair of electrons is attached to an electron acceptor substance, for example attapulgite clay or a solid organic acid.

Surprisingly, the colour formers of the formulae (1) to (6) used in the thermoreactive recording material of the present invention are characterised by a high rate of colour development with acid developers and at the same time by excellent light fastness.

The recording material normally comprises at least a carrier, a colour former, an electron acceptor substance and optionally a binder. Thermoreactive recording systems comprise for example heat-sensitive recording and copying materials and papers. These systems are used, for example, for recording information, e.g. in electronic computers, teleprinters or telewriters, and in measuring instruments. The image (mark) formation can also be effected manually with a heated pen. Laser beams can also be used to produce heat-induced marks.

The thermoreactive recording material can be so composed that the colour former is dispersed or dissolved in one binder layer and the developer is dissolved or dispersed in the binder in a second layer. A second possibility consists in dispersing both the colour former and the developer in the binder in one layer. By means of heat the binder is softened at specific areas and the colour former comes into contact with the electron acceptor substance at those points at which heat is applied and the desired colour develops at once.

The developers are the same electron-accepting substances as are used in pressure-sensitive papers. Advantageously the developer is solid at room temperature and melts or softens at temperatures above 50° C. As developers there are preferably used solid organic or inorganic Bronsted acids or inorganic acid salts with a $pK_a$ value of 4 or lower than 4.

Examples of such developers are attapulgite clay, silton clay, silica, bentonite, halloysite, aluminium oxide, aluminium sulphate, aluminium phosphate, zinc chloride, kaolin or any acid clay, or an acid polymeric material, for example a phenolic polymer, an alkylphenolacetylene resin, a maleic acid/rosin resin or a partially or completely hydrolysed polymer of maleic acid and styrene, ethylene, vinyl methyl ether or carboxypolymethylene, or p-, m- or o-hydroxybenzoic acid, gallic acid, phthalic acid, 3-nitrophthalic acid, 1-hydroxy-2-naphthoic acid, boric acid and aliphatic dicarboxylic acids, for example cyanoacetic acid, tartaric acid, oxalic acid, maleic acid or citric acid.

Such developers can also be used in combination with phenolic compounds, for example 4-tert.butyl-phenol, 4-phenylphenol, 4-hydroxydiphenyl ether, α-naphthol, β-naphthol, 4-hydroxybenzoic acid methyl ester, 4-hydroxyacetophenone, 2,2'-dihydroxydiphenyl, 4,4'-isopropylidene-diphenol, 4,4'-isopropylidene-bis-(2-methylphenol), 4,4'-bis-(hydroxyphenyl)-valeric acid, hydroquinone, pyrogallol, phloroglucinol.

Preferred developers are attapulgite clay, silton clay, or a solid organic Bronsted acid or mixtures of these substances.

Fusible, film-forming binders are preferably used for the manufacture of the thermoreactive recording material. These binders are normally water-soluble, whereas the colour formers and the developer are insoluble in water. The binder should be able to disperse and fix the colour former and the developer at room temperature. By applying heat the binder softens or melts, so that the colour former comes in contact with the developer and a colour is able to form. Examples of binders which are soluble or at least swellable in water are hydrophilic polymers, for example polyvinyl alcohol, polyacrylic acid, hydroxyethyl cellulose, methyl cellulose, carboxymethyl cellulose, polyacrylic amide, polyvinyl pyrrolidone, gelatin and starch.

If the colour former and the developer are in two separate layers, it is possible to use water-insoluble binders, i.e., binders which are soluble in non-polar or only weakly polar solvents, for example natural rubber, synthetic rubber, chlorinated rubber, alkyd resins, polystyrene, styrene/butadiene copolymers, polymethylmethacrylates, ethyl cellulose, nitrocellulose and polyvinyl carbazole. The preferred arrangement, however, is that in which the colour former and the developer are contained in one layer in a water-soluble binder.

The thermoreactive coatings can contain further additives. The coatings can contain, for example, talc, $TiO_2$, $ZnO$ or $CaCO_3$ or also organic pigments, for example urea/formaldehyde polymers for improving the degree of whiteness, facilitating the printing of papers, and for preventing the heated pen from sticking. In order to effect the colour formation only within a limited temperature range, it is possible to add substances such as urea, thiourea, acetanilide, phthalic anhydride or other appropriate fusible products which induce the simultaneous melting of the colour former and developer.

Typical thermoreactive recording materials in which the colour formers are used, are described, for example, in German Offenlegungsschriften 2,110,854 and 2,228,581, in French Pat. No. 1,524,826 and in Swiss Pat. Nos. 164,976, 407,184, 444,196 and 444,197.

Typical colour formers which are suitable for the thermoreactive copying and recording material of the present invention are listed in the following Tables I and II.

Table I

| No. | Substituents in formula (2) | | | | | Absorption maximum λmax. (nm) | | Colour of the protonised dye |
|---|---|---|---|---|---|---|---|---|
| | $R_1$ | $R_2$ | $R_3$ | $X'_1$ | $X'_2$ | free base | protonised | |
| 1 | —H | —H | 4-N<H,COCH₃ | —CH₃ | —CH₃ | 411 | 550 | violet |
| 2 | 2-CH₃ | —H | —H | —CH₃ | —CH₃ | 401 | 506 | orange |
| 3 | —H | 3-CH₃ | —H | —CH₃ | —CH₃ | 406 | 520 | red |
| 4 | —H | —H | 4-CH₃ | —CH₃ | —CH₃ | 404 | 528/542 | red |
| 5 | 2-OCH₃ | —H | —H | —CH₃ | —CH₃ | 413 | 540 | violet |
| 6 | —H | —H | 4-OCH₃ | —CH₃ | —CH₃ | 404 | 556 | violet |
| 7 | 2-OCH₃ | —H | 4-OCH₃ | —CH₃ | —CH₃ | 412 | 578 | bluish green |
| 8 | 2-OCH₃— | —H | 5-OCH₃ | —CH₃ | —CH₃ | 425 | 560 | bluish green |
| 9 | —H | 3-Cl | —H | —CH₃ | —CH₃ | 416 | 510 | orange |
| 10 | —H | —H | 4-Cl | —CH₃ | —CH₃ | 415 | 519 | orange |
| 11 | —H | 3-Cl | 4-CH₃ | —CH₃ | —CH₃ | 413 | 510 | orange |
| 12 | 2-CH₃ | —H | 4-Cl | —CH₃ | —CH₃ | 414 | 506 | orange |
| 13 | 2-CH₃ | —H | 5-Cl | —CH₃ | —CH₃ | 418 | 506 | orange |
| 14 | 2-OCH₃ | 4-OCH₃ | 5-Cl | —CH₃ | —CH₃ | 420 | 574 | greenish grey |
| 15 | 2-OC₆H₅ | —H | 5-Cl | —CH₃ | —CH₃ | 430 | 518 | orange |
| 16 | 2-O-(2,4-dichlorophenyl) | —H | —H | —CH₃ | —CH₃ | 418 | 518 | orange |
| 17 | 2-COOCH₃ | —H | —H | —CH₃ | —CH₃ | 417 | 518 | cherry red |
| 18 | —H | 3-SO₂—N(piperidino) | 4-CH₃ | —CH₃ | —CH₃ | 420 | 514 | orange |
| 19 | —H | 3-SO₂—N(CH₃)(C₆H₅) | 4-CH₃ | —CH₃ | —CH₃ | 419 | 517/535 | orange |
| 20 | —H | 3-CH₃ | 4-OCH₃ | —CH₃ | —CH₃ | 408 | 542 | brown |
| 21 | —H | —H | 4-N<CH₃,COCH₃ | —CH₃ | —CH₃ | 418 | 520 | orange |
| 22 | —H | —H | 4-CO—N(CH₃)₂ | —CH₃ | —CH₃ | 421 | 516 | orange |
| 23 | —H | —H | 4-N<H,COCH₃ | —CH₃ | —CH₂CH₂CN | 405 | 556 | violet |
| 24 | —H | 3-CH₃ | —H | —CH₃ | —CH₂CH₂CN | 356 | 522/538 | red |
| 25 | —H | —H | 4-CH₃ | —CH₃ | —CH₂CH₂CN | 396 | 534 | brown |
| 26 | 2-OCH₃ | —H | —H | —CH₃ | —CH₂CH₂CN | 400 | 542 | brown |
| 27 | 2-OCH₃ | —H | 5-OCH₃ | —CH₃ | —CH₂CH₂CN | 416 | 566 | grey |
| 28 | —H | 3-Cl | —H | —CH₃ | —CH₂CH₂CN | 406 | 513/534 | orange |
| 29 | —H | —H | 4-Cl | —CH₃ | —CH₂CH₂CN | 404 | 523/541 | orange |
| 30 | —H | 3-Cl | 4-CH₃ | —CH₃ | —CH₂CH₂CN | 404 | 523/540 | orange |

Table I-continued

| No. | R$_1$ | R$_2$ | R$_3$ | X'$_1$ | X'$_2$ | λmax. free base | (nm) protonised | Colour of the protonised dye |
|---|---|---|---|---|---|---|---|---|
| 31 | —H | 3-CH$_3$ | —H | —C$_2$H$_5$ | —CH$_2$C$_6$H$_5$ | 400 | 524/543 | brown/orange |
| 32 | 2-COOCH$_3$ | —H | —H | —C$_2$H$_5$ | —CH$_2$C$_6$H$_5$ | 418 | 527/542 | red |
| 33 | 2-CH$_3$ | 3-Cl | —H | —CH$_3$ | —CH$_3$ | 413 | 500 | orange |
| 34 | 2-O—C$_6$H$_5$ | —H | 5-t-C$_5$H$_{11}$ | —CH$_3$ | —CH$_3$ | 416 | 526 | orange |
| 35 | —H | —H | 4-OCH$_3$ | —CH$_3$ | —CH$_2$CH$_2$CN | 398 | 555 | brown |
| 36 | 2-OCH$_3$ | 4-OCH$_3$ | 5-Cl | —CH$_3$ | —CH$_2$CH$_2$CN | 412 | 574 | brown/green |
| 37 | 2-OCH$_3$ | —H | -5-SO$_2$—N(C$_2$H$_5$)(C$_2$H$_5$) | —CH$_3$ | —CH$_3$ | 427 | 522 | violet |

Table II

| No. | R$_1$ | R$_2$ | R$_3$ | X$_3$ | λmax. free base | (nm) protonised | Colour of the protonised dye |
|---|---|---|---|---|---|---|---|
| 101 | —H | 3-SO$_2$—N(piperidinyl) | 4-CH$_3$ | —C$_2$H$_5$ | 485 | 540 | violet |
| 102 | —H | 3-SO$_2$—N(CH$_3$)(CH$_3$) | 4-CH$_3$ | —C$_2$H$_5$ | 486 | 544 | violet |
| 103 | 2-CH$_3$ | —H | 4-Cl | —C$_2$H$_5$ | 466 | 540 | violet |

EXAMPLE 1

(A) 7 g of the colour former No. 7 of Table I, 300 g of a 10% aqueous polyvinyl alcohol solution and 130 ml of water are triturated together for 1 hour to give an aqueous preparation with a viscosity of 23 to 28 centipoise. The diameter of the colour former particles is app. 1 to 3 μ.

(B) Simultaneously, 70 g of 4,4'-isopropylidene-diphenol, 42 g of silton clay and 300 g of a 10% aqueous polyvinyl alcohol solution are triturated with 130 ml of water for 1 hour. After trituration, the particles have a diameter of 1 to 3 μ.

(C) 6 g of the colour former dispersion A) and 134 g of the developer dispersion B) are then mixed and applied to a sheet of paper to give a coating of 3 to 4.5 g/m$^2$.

The dried paper is coated with 3% of colour former, 67% of developer, and 30% of polyvinyl alcohol.

The coated paper is then laid with the coated face downwards on an untreated paper surface. Using a heated pen it is possible to apply markings on the upper side of the two-sheet system and these are transferred accurately to the second bottom sheet.

The other colour formers of Tables I and II can be used with similar success instead of colour former No. 7.

EXAMPLE 2

The following liquids A and B are ground separately in a ball mill and dispersed and then mixed:

| liquid A: | colour former No. 17 of Table I | 1 g |
|---|---|---|
| | 5% aqueous solution of hydroxy-ethyl cellulose | 5 g |
| | water | 5 g |
| liquid B: | 4,4'-(1-methylhexylidene)-diphenol | 4 g |
| | phenolic resin obtained by condensing 1 mole of 4,4'-isopropylidene-diphenol and 2 moles of | |

-continued

| formaldehyde | 1 g |
|---|---|
| attapulgite clay | 3 g |
| 5% aqueous solution of hydroxy-ethyl cellulose | 25 g |
| water | 22 g |

The mixture thus obtained is applied as a coating to normal paper with a weight of 50 g/m$^2$ in such a way that, after it has been dried, the paper has been coated to an amount of app. 4 g/m$^2$. Drying is effected at a temperature below 40° C. A heat-sensitive recording paper is thereby obtained. The coating layer forms a red colour when contacted by a hot pen by hot writing. Almost no gradual disappearance of the writing on this paper occurs after prolonged storage.

EXAMPLE 3

Two dispersions (liquid A and liquid B) are initially prepared.

Liquid A is prepared by grinding 1 g of the colour former No. 18, 5 g of a 5% aqueous solution of hydroxyethyl cellulose and 4.4 g of water in a ball mill.

Liquid B is prepared by grinding 5 g of p,p'-(1-methyl-n-hexylidene)-diphenol, 8 g of maleic acid, 25 g of a 5% aqueous hydroxyethyl cellulose solution and 22 g of water in a ball mill.

The two dispersions are subsequently mixed. The liquid mixture is applied to a normal paper with a surface weight of 50 g/m$^2$ and the coated paper is dried. The amount of material applied is 3 g/m$^2$ (dry weight).

The heat-sensitive recording paper obtained is stable at room temperature. A red colour develops rapidly at app. 90° C. Contact with a heated pen produces a clear recording.

EXAMPLE 4

The following dispersions are prepared separately:

(A) 25 g of the colour former No. 10 and 100 g of a 1% solution of hydroxypropylmethyl cellulose with a degree of substitution of 19 to 24 by methoxy and of 4 to 12 by propylene glycol (2% solution, 400 centipoise), are ground together and the mixture is filtered.

(B) 20 g of isopropylidene-diphenol, 25 g of cyanoacetic acid, 30 g of colloidal calcined kaolin with an absorption coefficient for oil of 82 cm³/100 g, and 200 g of hydroxypropylmethyl cellulose are ground together as in A) (1% solution in water) and the mixture is filtered.

Then 12.5 g of A) and 250 g of B) are mixed and the mixture is coated onto pure cellulose paper (60 g/m²), so that layers of 5 to 10 μ in thickness and a surface weight of 4.6 to 7 g/m² are obtained. Red markings are obtained by contacting the layer with a heat activated type head. Both the markings and the untreated background areas maintain their sharply delineated appearance when they are exposed to light and moisture.

EXAMPLE 5

20 g of the colour former No. 3 and 10 g of a copolymer of styrene and maleic anhydride are mixed and ground until the particles have attained a size of 0.5 to 2 μ. Then 50 g of 3-nitrophthalic acid and 10 g of a copolymer of styrene and maleic anhydride are mixed in the form of a solution and ground until a particle size of 2 to 3 μ is attained. These two compositions are then mixed and applied to a paper in a thickness of 2 to 5 μ (on drying).

Contact with a heating element at app. 40° to 160° C. effects a clear red marking.

EXAMPLE 6

20 g of colour former No. 1 of Table I and 10 g of a copolymer of styrene and maleic anhydride are mixed and ground for 1 hour until the particles have attained a size of 0.5 to 2 μ. A mixture of 10 g of a copolymer of styrene and maleic anhydride and 20 g of citric acid is ground until a particle size of 1 to 2 μ is attained. These two compositions are then mixed and applied in a thickness of 2 to 5 μ (on drying) to a paper substrate in order to produce a heat-sensitive recording material.

Contact with a heating element with a temperature of 60° to 110° C. produces a lilac-coloured marking.

EXAMPLE 7

(A) 85 g of bentonite, 115 g of water and 200 g of a 7.5% aqueous solution of hydroxyethyl cellulose are finely ground to an average particle size of 3 μ. A sheet, the so-called receiver sheet, is then coated with this preparation.

(B) 70 g of the colour former No. 37 of Table I, 400 g of a 7.5% aqueous solution of polyvinyl alcohol and 30 g of water are triturated together until the average particle size is 3 μ. A sheet, the so-called transfer sheet, is then coated with this preparation.

The two sheets A and B are then laid on top of each other with the coated sides face to face. A marking is produced by mechanical means on sheet B. After infrared irradiation, an accurate copy of the marking on sheet B is obtained in a violet colour on sheet A.

EXAMPLE 8

6 g of an aqueous dispersion which contains 1.5% of the colour former No. 8 of Table I and 6.7% of polyvinyl alcohol are mixed with 134 g of an aqueous dispersion which contains 14% of 4,4-isopropylidenediphenol, 25% of oxalic acid and 6% of polyvinyl alcohol. This mixture is applied to a paper and dried. When brought in contact with a heated pen, a strong bluish grey colour of excellent light fastness develops immediately.

Similar results are obtained by using any one of the other formers listed in Tables I or II.

I claim:

1. In a heat-sensitive recording material which contains in at least one fusible film-forming binder layer on a substrate, at least one color former dispersed or dissolved therein and at least one electron acceptor substance as a color developer, said electron acceptor substance being a solid organic or inorganic Brönsted acid or inorganic acid salt with a pKa value value of 4 or lower than 4, the improvement wherein the color former is an azo compound of the formula

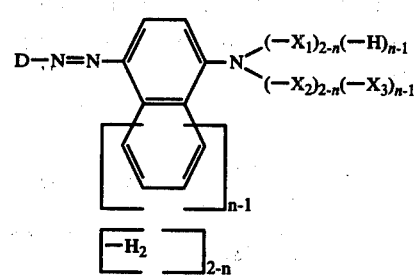

wherein
D represents a phenyl radical which is unsubstituted or substituted by halogen, alkyl, alkoxy, aryloxy, alkoxycarbonyl, N,N-dialkylaminocarbonyl, acylamino, N-acyl-N-alkylamino or the group

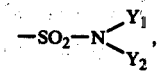

wherein each of $Y_1$ and $Y_2$ independently represents alkyl or aryl,
$X_1$ represents hydrogen or alkyl,
$X_2$ represents alkyl, cyanoalkyl or arylmethyl,
$X_3$ represents alkyl or aryl, and
N is 1 or 2.

2. A heat-sensitive recording material according to claim 1, wherein the colour former is an azo compound of the formula

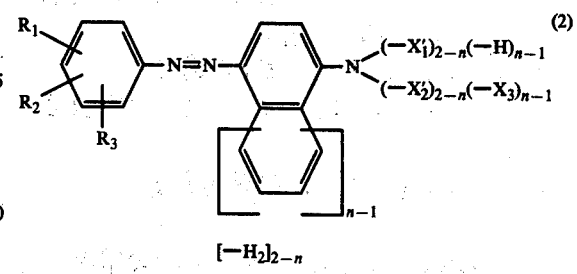

wherein
each of $R_1$, $R_2$ and $R_3$ represents hydrogen, halogen, alkyl, alkoxy, aryloxy, alkoxycarbonyl, N,N-dialkylaminocarbonyl, acylamino, N-acyl-N-alkylamino or

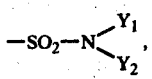

wherein each of

Y$_1$ and Y$_2$ represents alkyl or aryl,

X$_1'$ represents hydrogen or alkyl,

X$_2'$ represents alkyl, cyanoalkyl or arylmethyl,

X$_3$ represents alkyl or aryl, and n is 1 or 2.

3. A heat-sensitive recording material according to claim 2, wherein n is 1.

4. A heat-sensitive recording material according to claim 2, wherein the colour former is an azo compound of the formula

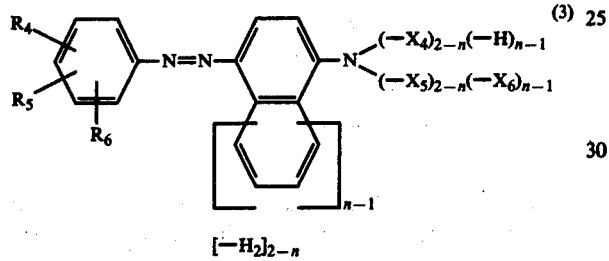

(3)

wherein each of R$_4$, R$_5$ and R$_6$ represents hydrogen, halogen, lower alkyl, lower alkoxy, halophenoxy, phenoxy, lower alkoxycarbonyl, N,N-di-lower alkylaminocarbonyl, acetylamino, N-acetyl-N-lower alkylamino or

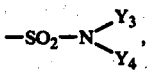

wherein each of Y$_3$ and Y$_4$ represents lower alkyl or phenyl, and at most two of the radicals R$_4$, R$_5$ and R$_6$ represent hydrogen, X$_4$ represents hydrogen or lower alkyl, X$_5$ represents lower alkyl, cyano-lower alkyl or benzyl, X$_6$ represents lower alkyl or phenyl, and n is 1 or 2.

5. A heat-sensitive recording material according to claim 4, wherein n is 1.

6. A heat-sensitive recording material according to claim 4, wherein the colour former is an azo compound of the formula (4)

wherein each of R$_7$, R$_8$ and R$_9$ represents hydrogen, chlorine, methyl, methoxy, phenoxy, dichlorophenoxy, methoxycarbonyl, N,N-dimethylaminocarbonyl, acetylamino, N-acetyl-N-methylamino or $$-SO_2-N\begin{matrix}Y_5\\Y_6\end{matrix},$$

wherein each of Y$_5$ and Y$_6$ represents methyl, ethyl or phenyl, and at most two of the radicals R$_7$, R$_8$ and R$_9$ represent hydrogen, X$_7$ represents methyl or ethyl, X$_8$ represents methyl, 2-cyanoethyl or benzyl, X$_9$ represents methyl or ethyl, and n is 1 or 2.

7. A heat-sensitive recording material according to claim 6, wherein the colour former is an azo compound of the formula (5)

wherein R$_7$, R$_8$, R$_9$, X$_7$ and X$_8$ are as defined in claim 6.

8. A heat-sensitive recording material according to claim 7, wherein the colour former is an azo compound of the formula (6)

wherein each of R$_{10}$, R$_{11}$ and R$_{12}$ represents hydrogen, chlorine, methoxy, methoxycarbonyl, N,N-diethylaminosulphonyl or acetylamino, and at most two of the radicals R$_{10}$, R$_{11}$ and R$_{12}$ represent hydrogen.

9. A heat-sensitive recording material according to claim 8, wherein the colour former is an azo compound of the formula $$CH_3O-\text{ring}-N=N-\text{ring}-N(CH_3)_2$$
$$OCH_3$$

10. A heat-sensitive recording material according to claim 1 which contains as colour developer attapulgite clay, silton clay or a solid organic Brönsted acid or a mixture of these developers.

11. A heat-sensitive recording material according to claim 10, wherein the substrate is paper.

* * * * *